(12) United States Patent
Chen et al.

(10) Patent No.: US 9,665,390 B2
(45) Date of Patent: May 30, 2017

(54) DEPLOYMENT OF INSTANCES AMID CONFIGURATION CHANGES

(71) Applicant: INTERNATIONAL BUSINESS MACHINES CORPORATION, Armonk, NY (US)

(72) Inventors: Hong Chen, Beijing (CN); Xue Xiang Cui, Beijing (CN); Tan Jiang, Beijing (CN); Zhen Xin Jiao, Beijing (CN); Xin Li, Beijing (CN); Xin Peng Liu, Beijing (CN); Yong Yao, Beijing (CN); Yu Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/923,215

(22) Filed: Oct. 26, 2015

(65) Prior Publication Data

US 2017/0116013 A1 Apr. 27, 2017

(51) Int. Cl.
*G06F 9/45* (2006.01)
*G06F 9/455* (2006.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,769,531 B2 | 7/2014 | Anderson et al. | |
| 8,776,053 B2 | 7/2014 | Lagergren et al. | |
| 8,874,742 B2 | 10/2014 | Johnsen et al. | |
| 2007/0112574 A1* | 5/2007 | Greene | G06F 9/5072 340/572.1 |
| 2011/0265164 A1* | 10/2011 | Lucovsky | G06F 9/45533 726/7 |
| 2014/0040343 A1* | 2/2014 | Nickolov | G06F 9/4856 709/201 |
| 2014/0040888 A1 | 2/2014 | Bookman et al. | |

(Continued)

OTHER PUBLICATIONS

Peter Mell et al., "The NIST Definition of Cloud Computing", National Institute of Standards and Technology, U.S Department of Commerce, NIST Special Publication 800-145, Sep. 2011, 7 pages.

*Primary Examiner* — Tuan Dao
(74) *Attorney, Agent, or Firm* — Heslin Rothenberg Farley & Mesiti P.C.

(57) ABSTRACT

In one embodiment, a method includes a processor deploying one or more scripts in a first deployment instance, where the first deployment instance is deployed from a first shared computing environment. The processor determines a difference between the first deployment instance at deployment and the first deployment instance at runtime and based on this determination, selects a first script from the one or more scripts. The processor captures a representation of the first deployment instance and selects a second script, where second script sets up relationships between resources of the first deployment instance in a subsequently deployed deployment instance. The processor utilizes the representation, the first script, and the second script to deploy a second deployment instance from a second shared computing environment.

20 Claims, 9 Drawing Sheets

(56) References Cited

U.S. PATENT DOCUMENTS

| | | |
|---|---|---|
| 2014/0115285 A1 | 4/2014 | Arcese et al. |
| 2014/0130036 A1* | 5/2014 | Gurikar .................. G06F 8/61 |
| | | 717/176 |
| 2014/0149591 A1 | 5/2014 | Bhattacharya et al. |

* cited by examiner

600

610

Program deploys one or more scripts as part of a first deployment instance deployed from a first shared computing environment.

620

Program determines that there is a difference between the first deployment instance at deployment and the first deployment instance at runtime.

630

Based on the determining, program selects a first script from the scripts deployed as part of the deployment instance

640

Program captures a representation of the first deployment instance

650

Based on the selected first script, program selects a second script, wherein the second script sets up the relationships between the resources of the first deployment instance.

660

Program utilizes the representation, the first script, and the second script to deploy a second deployment instance from a second shared computing environment

FIG. 6

DEPLOYMENT OF INSTANCES AMID CONFIGURATION CHANGES

TECHNICAL FIELD

One or more aspects of the present invention relate to restoring deployment instances to ensure continuity across differing technical environments.

BACKGROUND

Multi-user computing environments, including, but not limited to, public and private cloud computing environments, as well as remotely accessible data centers and co-location facilities, often provide users with the opportunity to configure elements of the technical environment being deployed. For example, servers in a multi-user computing environment may deploy a middleware platform to users, including, but not limited to, a set of virtual machines (VMs), wherein each virtual machine deployed has middleware installed on top of an operating system (OS). When utilizing these virtual machines, individual users may make changes to the configuration. These configurations changes impact the configurations of the individual VMs as well as the relationships between the deployed VMs. Should the multi-user computing environment change, the changes implemented by the users may not be preserved. When such a change results in the loss of a user's configurations changes, the user experience, including both efficiency and efficacy, is negatively impacted.

SUMMARY

Shortcomings of the prior art are overcome and additional advantages are provided through the provision of a method. The method includes, for instance: deploying, by the one or more processor, one or more scripts in a first deployment instance, wherein the first deployment instance is deployed from a first shared computing environment; determining, by the one or more processor, a difference between the first deployment instance at deployment and the first deployment instance at runtime; based on the determining, selecting, by the one or more processor, a first script from the one or more scripts; capturing, by the one or more processor, a representation of the first deployment instance; based on the selecting the first script, selecting, by the one or more processor, a second script, wherein the second script implements relationships between resources of the first deployment instance in a subsequent deployment of the first deployment instance; and utilizing, by the one or more processor, the representation, the first script, and the second script to deploy a second deployment instance from a second shared computing environment, wherein the second deployment instance is a subsequent deployment of the first deployment instance.

Shortcomings of the prior art are overcome and additional advantages are provided through the provision of a computer program product. The computer program product includes, for instance, a computer readable storage medium readable by a processing circuit and storing instructions for execution by the processing circuit for performing a method including: deploying, one or more processor, one or more scripts in a first deployment instance, wherein the first deployment instance is deployed from a first shared computing environment; determining, by the one or more processor, a difference between the first deployment instance at deployment and the first deployment instance at runtime; based on the determining, selecting, by the one or more processor, a first script from the one or more scripts; capturing, by the one or more processor, a representation of the first deployment instance; based on the selecting the first script, selecting, by the one or more processor, a second script, wherein the second script implements relationships between resources of the first deployment instance in a subsequent deployment of the first deployment instance; and utilizing, by the one or more processor, the representation, the first script, and the second script to deploy a second deployment instance from a second shared computing environment, wherein the second deployment instance is a subsequent deployment of the first deployment instance.

Shortcomings of the prior art are overcome and additional advantages are provided through the provision of a system. The system includes, for instance, a memory; one or more processor in communication with the memory; and program instructions executable by the one or more processor via the memory for performing a method, the method including: deploying, one or more processor, one or more scripts in a first deployment instance, wherein the first deployment instance is deployed from a first shared computing environment; determining, by the one or more processor, a difference between the first deployment instance at deployment and the first deployment instance at runtime; based on the determining, selecting, by the one or more processor, a first script from the one or more scripts; capturing, by the one or more processor, a representation of the first deployment instance; based on the selecting the first script, selecting, by the one or more processor, a second script, wherein the second script implements relationships between resources of the first deployment instance in a subsequent deployment of the first deployment instance; and utilizing, by the one or more processor, the representation, the first script, and the second script to deploy a second deployment instance from a second shared computing environment, wherein the second deployment instance is a subsequent deployment of the first deployment instance.

Computer systems and methods relating to one or more aspects of the technique are also described and may be claimed herein. Further, services relating to one or more aspects of the technique are also described and may be claimed herein.

Additional features and are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and objects, features, and advantages of one or more aspects of the invention are apparent from the following detailed description taken in conjunction with the accompanying drawings in which:

FIG. 6 depicts a workflow of certain aspects of an embodiment present invention;

DETAILED DESCRIPTION

Figure 1:
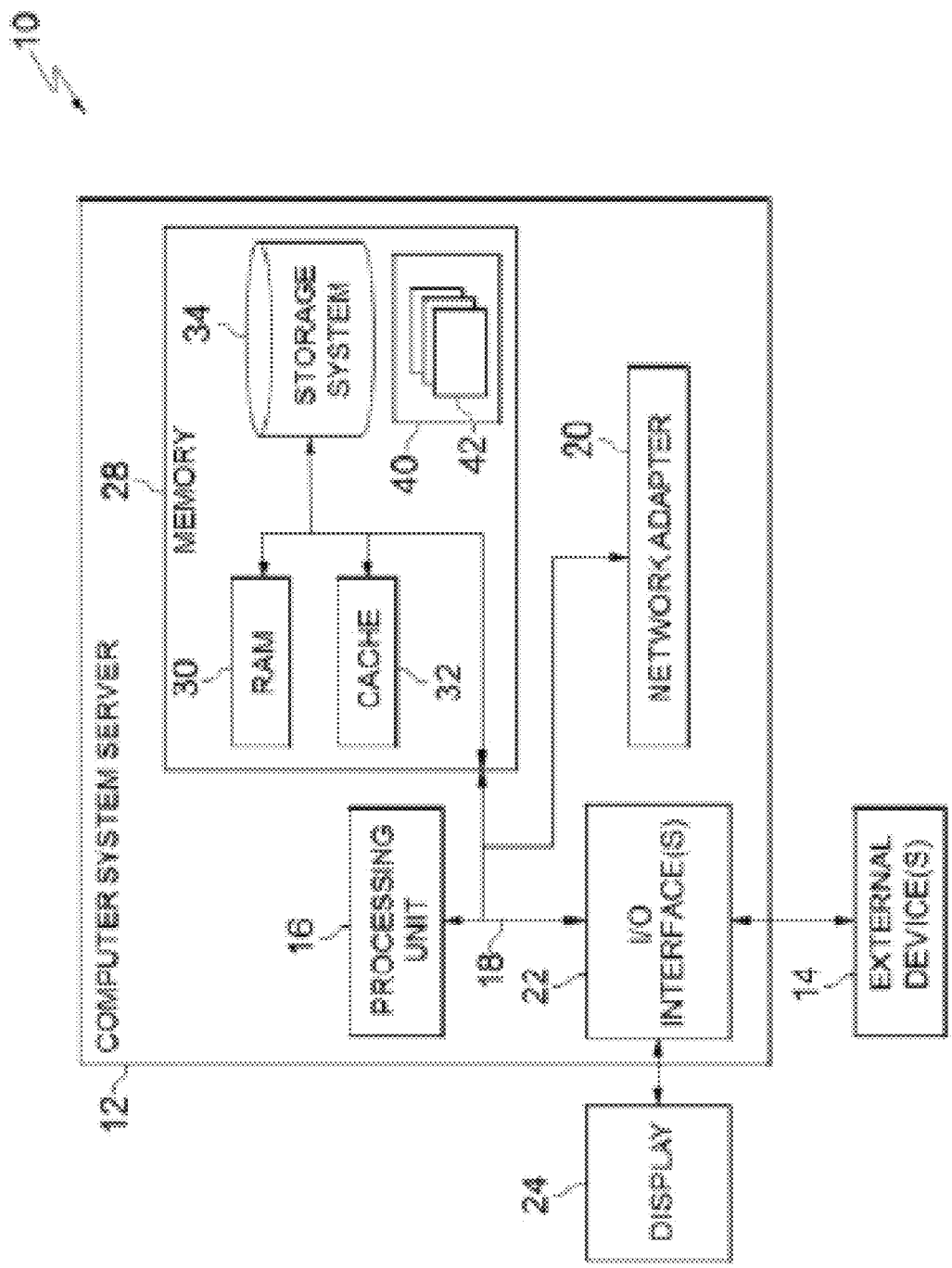
FIG. 1 depicts a cloud computing node, in accordance with one or more aspects set forth herein.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention.

Multiple users may rely on shared environments, such as cloud computing environments, for computing resources. To meet the computing needs on these users, these multi-user environments deploy a middleware platform, for example, a set of virtual machines (VMs), to various users of the platform. While taking advantage of the physical resources of the shared platform, users may have the opportunity to configure their own virtual resources, such as the aforementioned VMs, that have been deployed to them. Users configuring VMs deployed from a shared resource environment is not uncommon, as both during runtime and maintenance, users may manually and/or semi-automatically reconfigure various aspects of VMs. Users may make configuration changes that may affect the operating system (OS) and the middleware layer, which is installed on top of the OS. Because a middleware platform, which can be understood as a deployment instance, may contain multiple VMs, by reconfiguring aspects of the deployment, a user may not only change settings within individual VMs, the user may also change aspects of the relationships of the various VMs in the deployment instance to each other.

One advantage of relying on the hardware and software resources of a shared multi-user environment, including, but not limited to, a cloud computing environment, is that the user is not affected by changes in the physical environment itself. Ideally, an administrator of a shared multi-user environment should be able to swap out hardware and software resources, reconfigure these resources, and otherwise implement changes to these resources, without affecting the virtual resources deployed to the users. Some changes to this technical environment may necessitate re-deployment of the instance. In this case, the middleware platform, including any VMs, may be backed up and re-deployed. For example, the underlying shared multi-user environment itself may be swapped out for a new environment.

Unfortunately, because the user may configure aspects of his or her own deployment instance, when certain changes are made to the multi-user environment, the configuration changes made by the user may be lost, including, but not limited to, the changes the user made to his or her individual VMs and the changes the user made to aspects of the relationships of the various VMs in the deployment instance to each other, in a situation where the instance is redeployed in a different environment. For example, changes to the VMs and to the relationships between the VMs complicate reconfiguring the deployment instance automatically in a new multi-user environment, when variables vary between the old environment and the new environment, including, but not limited to, the Internet Protocol address (IP) and the hostname assigned to these VMs.

In order to seamlessly provide computing resources to users, an administrator of a multi-user environment, such as a cloud, may wish to back up the deployed instances in order to re-deploy the instances in another multi-user environment, such as another cloud. However, when users are reconfiguring elements of their deployment instances, making a backup that contains all these manual configuration changes can be a challenge. In addition to automatically recovering a deployment from a backup instance, another challenge to the multi-user environment amidst manual user configuration changes is retaining the relationships between the various virtual entities that comprise the middleware.

For example, an embodiment of the present invention may be utilized to back up a deployment instance from a first cloud computing system and restore the instance in a second cloud computing system. In an embodiment of the present invention, the first computing environment and the second computing environment are in different domains.

Certain aspects of some embodiments of the present invention offer advantages and improvements in the efficiency of multi-user computing environments. For example, by preserving configuration changes made by individual users, the multi-user environment as a whole can be more accurately backed up and more accurately restored. The ability to quickly and accurately restore a shared environment, including, but not limited to, restoring various deployment instances in a cloud computing environment, increases both the efficiency and the integrity of the environment for those utilizing its resources. Additionally, by retaining the configurations for the running instance which are manually changed by users reduces the maintenance burden for the clients and the administrators of the shared environment.

As discussed above, the shared environment may be a cloud and therefore some embodiments of the present invention may offer functionality described below to a user in a Software as a Service (SaaS) model, i.e., aspects of the method described are executed by one or more processors in a cloud infrastructure. Embodiments of the present invention that utilize the cloud infrastructure may be especially advantageous when it is the resources of the cloud that are providing various services to different users of the cloud, wherein the individual services may be provided as part of the middleware platform, deployed to each user in the cloud computing environment. By utilizing an active instance of cloud infrastructure, through a deployment instance, while the active instance automatically backs up elements of the deployment instance in a passive/backup instance of the cloud infrastructure, users may utilize all the advantages offered in a SaaS model without losing the ability to manually configure their virtual resources to their needs and with the security of having the redundancy of the backup instance, which despite configuration changes, can provide business continuity to the users, in accordance with aspects of the present invention.

FIGS. 1-4 depict various aspects of computing, including cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, mobile devices, personal data assistants, and distributed cloud computing environments that include any of the above systems or devices, and the like.

Computer system 12 may be described in the general context of computer system-executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in cloud computing node 10 is shown in the form of a general-purpose computing device. The components of computer system 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20.

As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
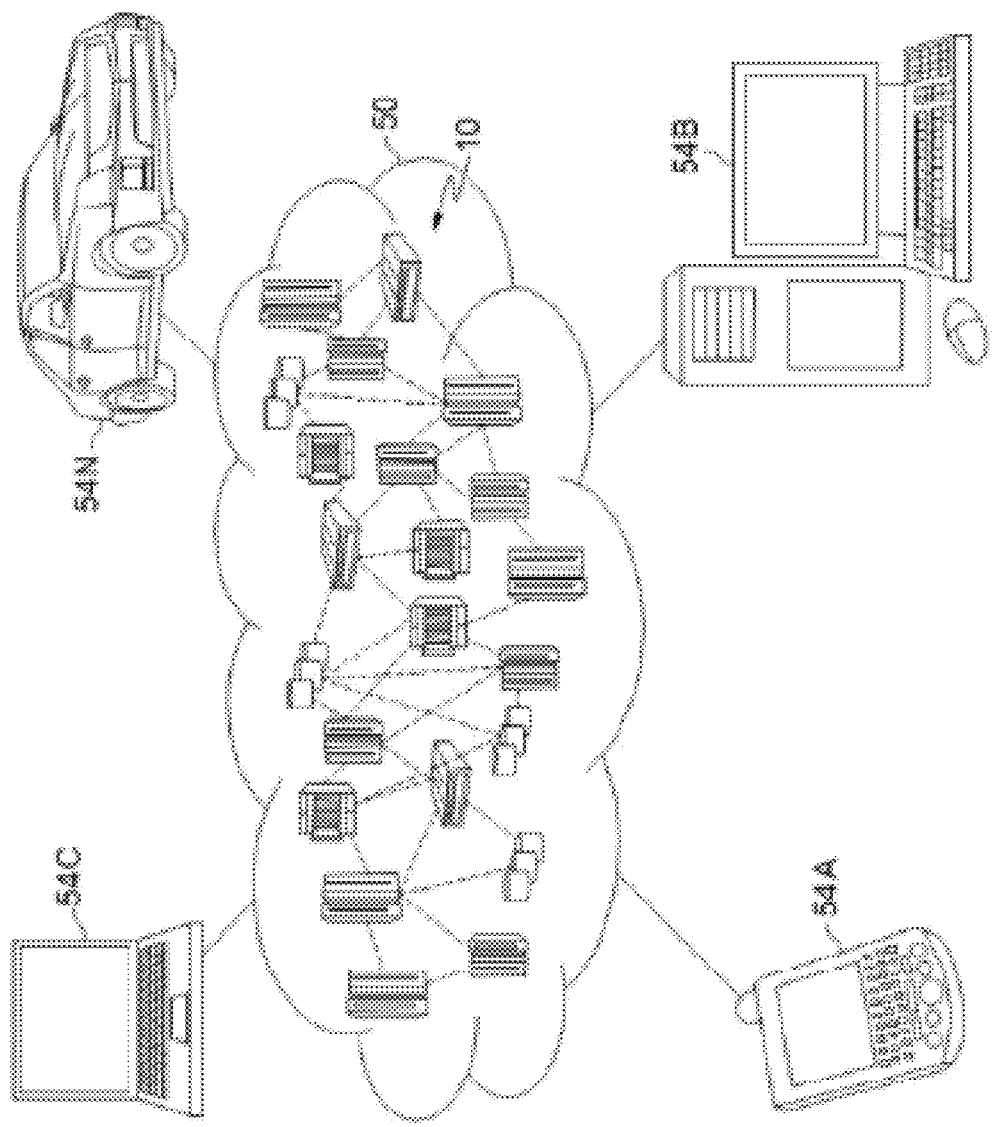
FIG. 2 depicts a cloud computing environment, in accordance with one or more aspects set forth herein.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
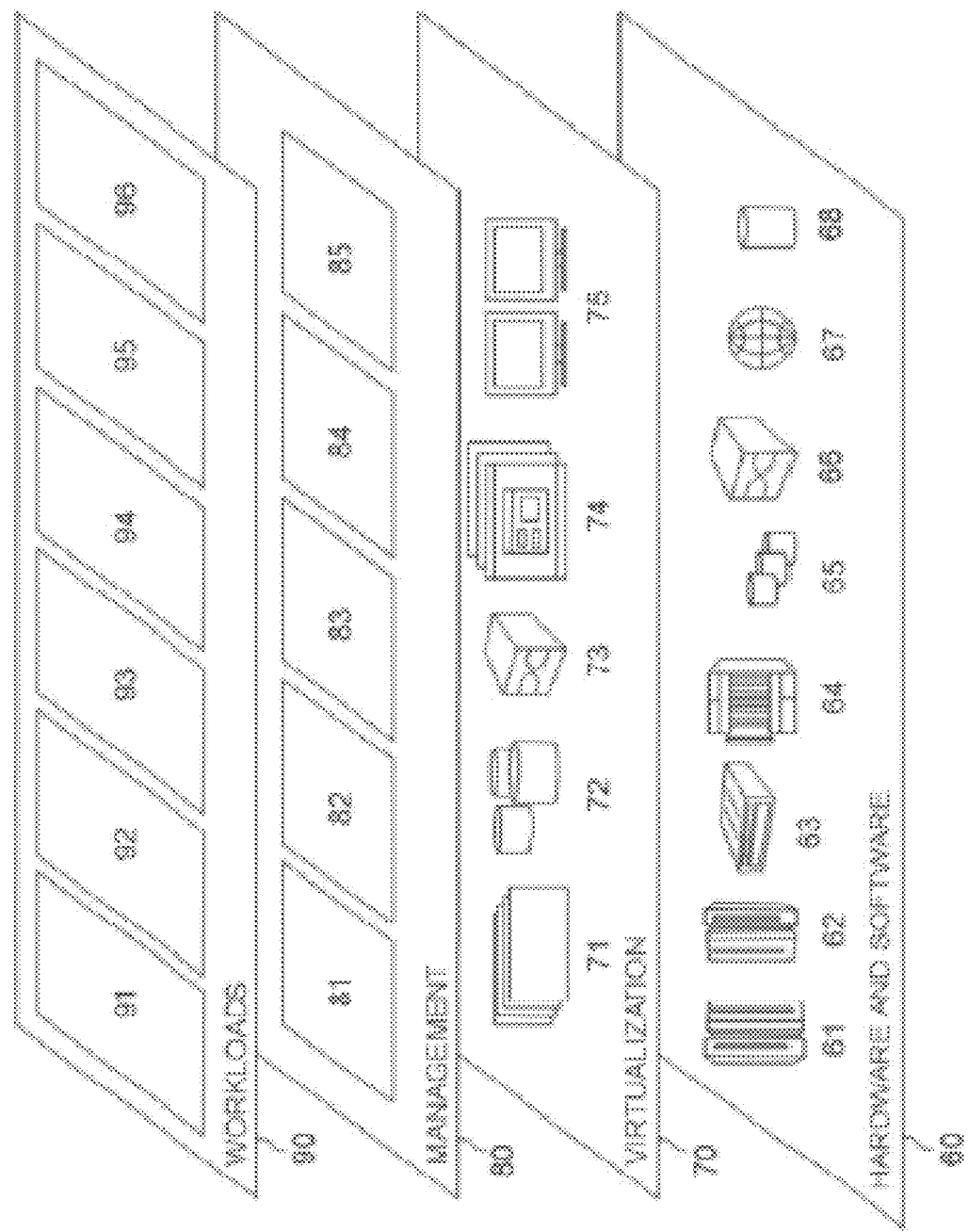
FIG. 3 depicts abstraction model layers, in accordance with one or more aspects set forth herein.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and backing up and restoring deployment instances for clients 96, as described herein.

Figure 4:
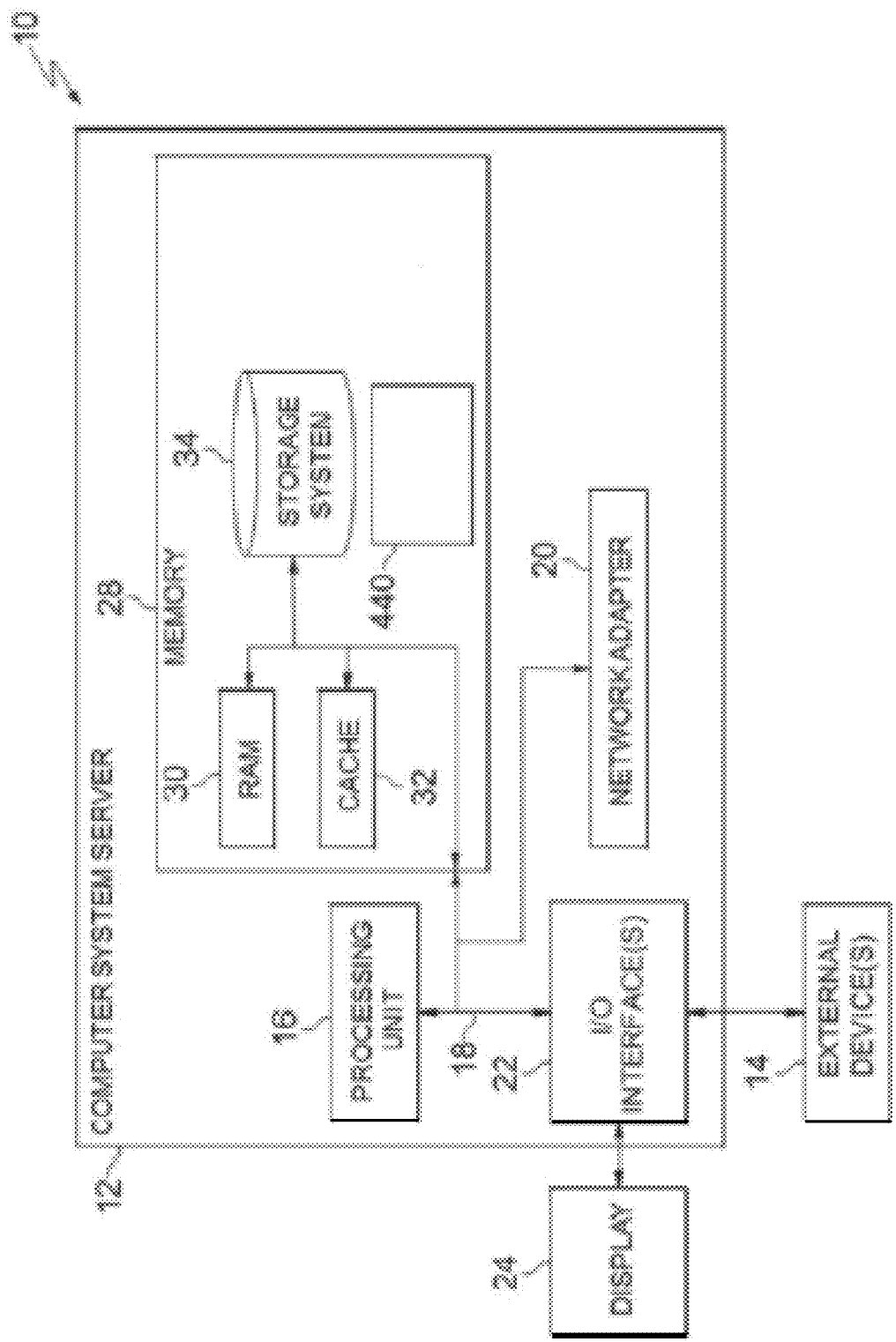
FIG. 4 depicts a hardware overview of a computing node, in accordance with one or more aspects set forth herein.

FIG. 4 depicts a hardware overview of a computing node 10, in accordance with one or more aspects set forth herein.

Program/utility 40 as set forth in FIG. 1 can include one or more program 440 as set forth in FIG. 4, and program/utility 40, including, for example one or more program 440 to back up and restore deployment instances for clients, as described in work layer 96. Program/utility 40 as set forth in FIG. 1 can include one or more program 440.

One or more program 440 can have a set (at least one) of program modules, and may be stored in memory 28 by way of example, and not limitation, as well as an operating system, one or more application programs, other program modules, and program data. Each of the operating system, one or more application programs, other program modules, program data, and one or more program, or some combination thereof, may include an implementation of a networking environment. One or more program 440 generally carry out the functions and/or methodologies of embodiments of the invention as described herein.

Referring again to FIG. 4:

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As aforementioned, aspects of various embodiments of the present invention include a method for backing up deployment instances and restoring the deployment instance utilizing a first (active) shared computing environment and a second (backup) shared computing environment. Throughout this specification, one or more cloud computing environments 50 (FIG. 1) may be referenced or pictured to represent one type of computing environment into which aspects of the present invention may be deployed. However, the cloud computing environment 50 (FIG. 1) is merely one example of an environment is which advantages of certain aspects of some embodiments of the present invention may be realized.

Figure 5:
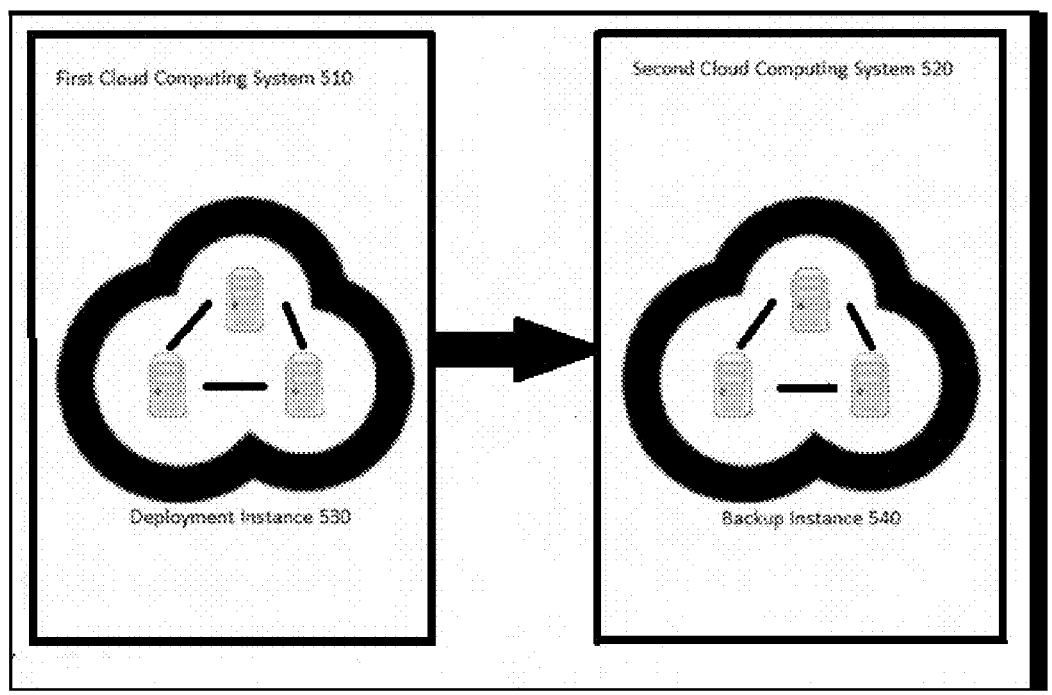
FIG. 5 depicts two cloud computing system instances that may be utilized in accordance with certain aspects of the present invention.

FIG. 5 depicts two cloud computing system instances, a first cloud computing system 510 and a second cloud computing system 520, that may be utilized in accordance with certain aspects of the present invention. As will be described in greater detail, one or more program 440 (as depicted in FIG. 4) executing on at least one computing resource, such as a computing system/server 12 (as seen in FIG. 1) within or communicatively coupled to the first cloud computing system 510, creates a backup of a deployment instance 530 utilized by a client and stores the backup, i.e., a backup instance 540 on a resource for deployment in the second cloud computing system 520. As explained earlier, the one or more program 440 deploys the backup instance 540 in a manner that preserves the configuration changes to the deployment instance 530 introduced by the user, including, but not limited to, changes to VMs in the middleware and changes to the OS, and preserves to the relationships of various virtual entities in the deployed middleware. In certain embodiments of the present invention, the first cloud computing system 510 is characterized as an active cloud instance, while the second cloud computing system 520 is characterized as a passive instance.

An embodiment of the present invention backs up and restores a deployment instance, including, but not limited to, an instance deployed by one or more resources of a cloud computing environment, where the restored instance includes any reconfiguration of middleware in the instance by a user, including, but not limited to, the reconfiguration of multiple VMs. Aspects of the present invention may be utilized to restore the deployment instance in a new technical environment, such as a separate cloud computing environment, and automatically restore not only any configuration changes to the virtual resources in the middleware, but also the relationships for multiple middleware parts in the instance.

FIG. 6 depicts a workflow 600 of certain aspects of an embodiment of the present invention. In an embodiment of the present invention, one or more program 440 (FIG. 4) deploys one or more scripts as part of a first deployment instance deployed from a first shared computing environment (610). In an embodiment of the present invention, the first deployment instance includes a platform with at least two resources. In a further example, the platform is a middleware platform and the resources include virtual resources, including, but not limited to, VMs. In this embodiment, the virtual resources are virtual resources of a first shared computing environment, which, in one non-limiting example, is a cloud computer environment 50 (FIG. 2). In an embodiment of the present invention, the one or more scripts include scripts executed at runtime and scripts executed at deployment.

In an embodiment of the present invention, the scripts include scripts that the one or more program 440 executes during deployment (e.g., pattern deployment), sometimes referred to as deployment scripts and scripts executed during runtime that revert the changes made by scripts during pattern deployment, for example, to preserve changes made to a deployment instance by a user. This second type of script may be referred to as a cleanup script. For example, the one or more program 440 may execute a cleanup script to revert changes made by a deployment script and reset the system environment in response to a deployment instance being re-deployed in a second environment. One or more program 440 and/or a user may select one or more cleanup script. The one or more program 440 executes the script in response to deploying a backup of the first deployment instance as a second deployment instance in a new shared environment. Elements preserved by executing a cleanup script include, but are not limited to, IP, locale, and/or password.

In an embodiment of the present invention, the scripts deployed to a given client as part of the first deployment instance are pre-defined for various users in one or more resource in the shared environment, which as aforementioned, can be a cloud computing environment 50 (FIG. 2). Thus, in this example, each of the one or more resources may be a cloud computing node 10 (FIG. 1).

Returning to FIG. 6, the one or more program 440 determines that there is a difference between the first deployment instance at deployment and the first deployment instance at runtime (620). Based on determining that there is a difference, the one or more program 440 selects a first script from the scripts deployed as part of the deployment instance (630). In an embodiment of the present invention, the first script is a cleanup script that implements configuration changes introduced by a user at runtime to a deployment instance without these changes (e.g., a deployment instance with the settings it has at initial deployment). In an embodiment of the present invention, a customer may also select the first script if the first script is in the application layer of the deployment instance, and the one or more program 440 obtains this selection. In an embodiment of the present invention, the one or more program 440 determines if there are differences between the instance at deployment and the instance at runtime by analyzing different layers of the instance, including, but not limited to, the middleware and OS layers, including the infrastructure of these layers. In an embodiment of the present invention, where the one or more program 440 determined that there is no difference between the instance at deployment and the instance at runtime, the one or more program may not select a first script and instead, can deploy the original instance in a new environment without preserving any changes, as none are present.

Returning to FIG. 6, the one or more program 440 captures a representation of the first deployment instance (640). In capturing the representation and selecting a first script, the one or more program 440 may later preserve configuration changes by executing the first script on the representation at deployment. The one or more program 440 can store both the representation and the first script on a memory resource. In this manner, the elements stored, the representation and the first script, represent a different stored state than the first deployment instance, as originally deployed by the one or more program 440, because the representation, in response to deployment and execution of the first script, may include configuration changes that were manually implemented in the first deployment instance, during runtime, by the user of resources of the first deployment instance.

Based on the selected first script, the one or more program 440 selects a second script, wherein the second script sets up the relationships between the resources of the first deployment instance (650). The second script may be a deployment script, meaning that the one or more program 440 would execute this script when deploying an instance.

The one or more program 440 utilizes the representation, the first script, and the second script to deploy a second deployment instance from a second shared computing environment (660). By deploying this second deployment instance, the one or more program 440 has effectively restored the functionality and user experience of the first deployment instance to the user because: 1) the second deployment instance includes the configuration changes that were manually made by the user when working with the first deployment instance; and 2) the selection and execution of the second script by the one or more program 440 enabled the one or more program 440 to preserve the relationships of the elements in the first deployment instance when deploying the second deployment instance. The second script preserves these relationships, which include relationships of different middleware parts. In an embodiment of the present invention, the second shared computing environment is a cloud computing environment that is distinct from the first shared computing environment, which may also be a cloud computing environment. In an embodiment of the present invention, the first shared computing environment and the second shared computing environment each have a different domain.

In an embodiment of the present invention, the first script and the second script may each reference one or more scripts or one or more script packages.

Figure 7:
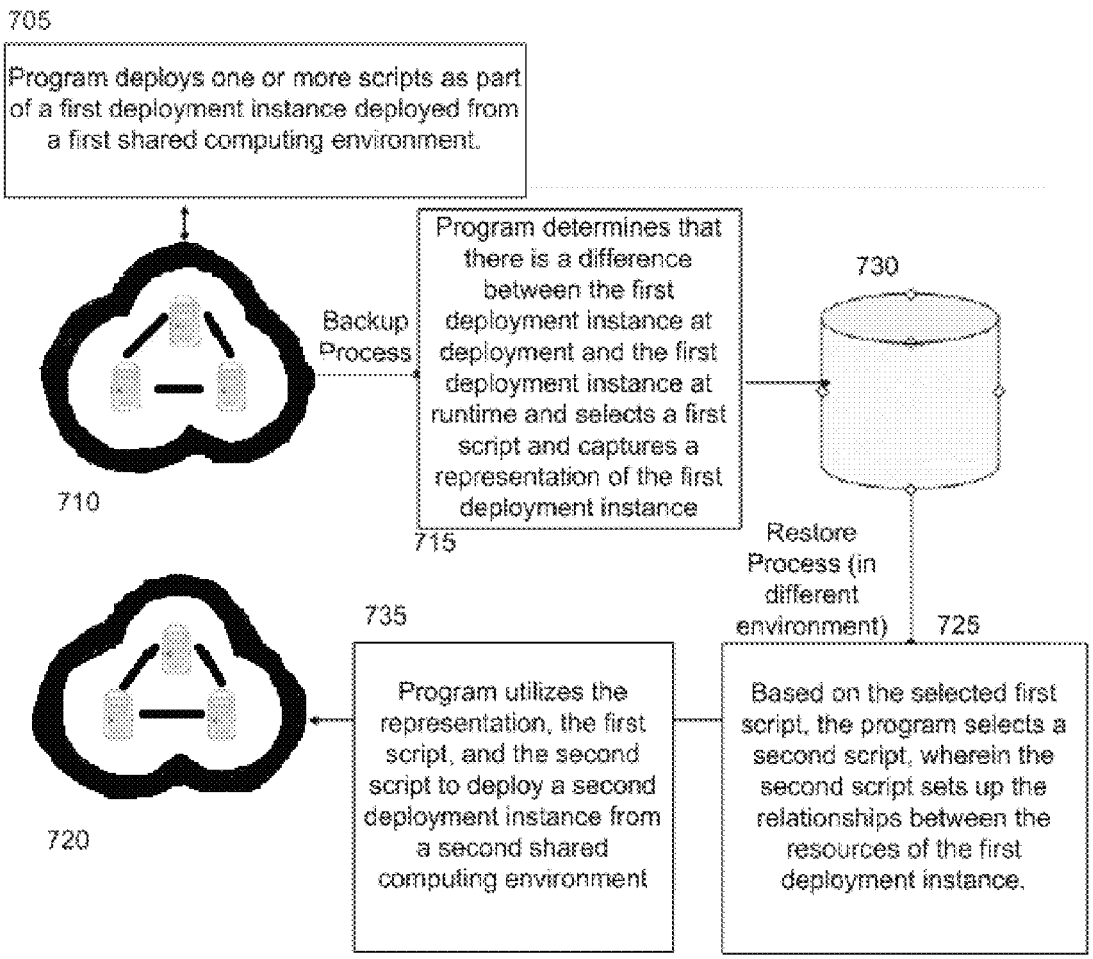
FIG. 7 depicts a workflow of certain aspects of an embodiment of the present invention visually overlaid on a representation of an example of a technical environment that may be utilized in accordance with this embodiment.

FIG. 7 depicts a workflow of certain aspects of an embodiment of the present invention visually overlaid on a representation of an example of a technical environment that may be utilized in accordance with this embodiment. For clarity, aspects of the technical environment of FIG. 5, are a first cloud computing system 710 (FIG. 5, 510) and a second cloud computing system 720 (FIG. 5, 520). As explained regarding FIG. 5, cloud computing systems in FIG. 7 represent shared computing resources which include cloud computing systems.

Illustrated utilizing the technical environment of FIG. 7 is the method of FIG. 6. For ease of understanding, FIG. 7 terms parts of the method as a Backup Process and another part of the method as a Restore Process. As noted in FIG. 7, during the Backup Process, the one or more program 440 takes a representation of an instance deployed by a first environment, in this example, a first cloud computing system 710. In this example, during the Restore Process, the one or more program 440 restores the instance from the first cloud computing system 710 in a different environment, in this example, a second cloud computing system 720. As depicted in the embodiment of FIG. 7, one or more program 440 deploys one or more scripts as part of a first deployment deployed from a first shared user computing environment (705). The computing environment is a cloud computing environment 710. As aforementioned, a customer to whom the instance is deployed may make changes manually and semi-automatically to the configuration. Thus, the one or more program 440 determines that there is a difference between the first deployment instance at deployment and the first deployment instance at runtime, and based on making this determination, the one or more program 440 selects a first script from the scripts deployed as part of the deployment instance and captures a representation of the first deployment instance (715). In certain embodiments of the present invention, the one or more program 440 stores the representation and the selection of the first script and/or the first script itself in a memory resource 730 internal and/or accessible to one or more of the first cloud computing system 710 and/or the second cloud computing system 720. Based on the selected first script, the one or more program 440 selects a second script, wherein the second script sets up the relationships between the resources of the first deployment instance (725). The one or more program 440 may also store the selection of the second script and/or the second script itself in a memory resource 730. The one or more program 440 utilizes the representation, the first script, and the second script to deploy a second deployment instance from a second shared computing environment (735), which in this example, is a second cloud computing system 720.

Figure 8:
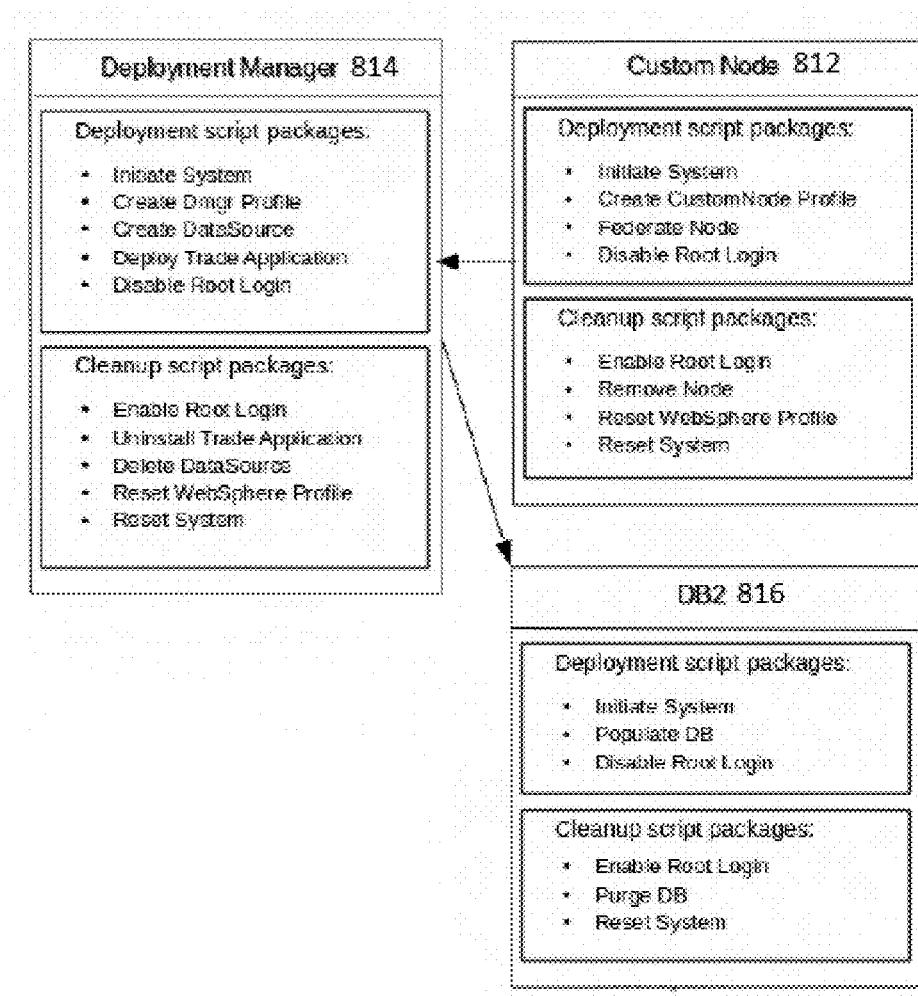
FIG. 8 depicts aspects of creating an original deployment and then capturing it for reuse in another environment in accordance with an example of a specific and non-exclusive topology that may be utilized in an embodiment of the present invention.
Figure 9:
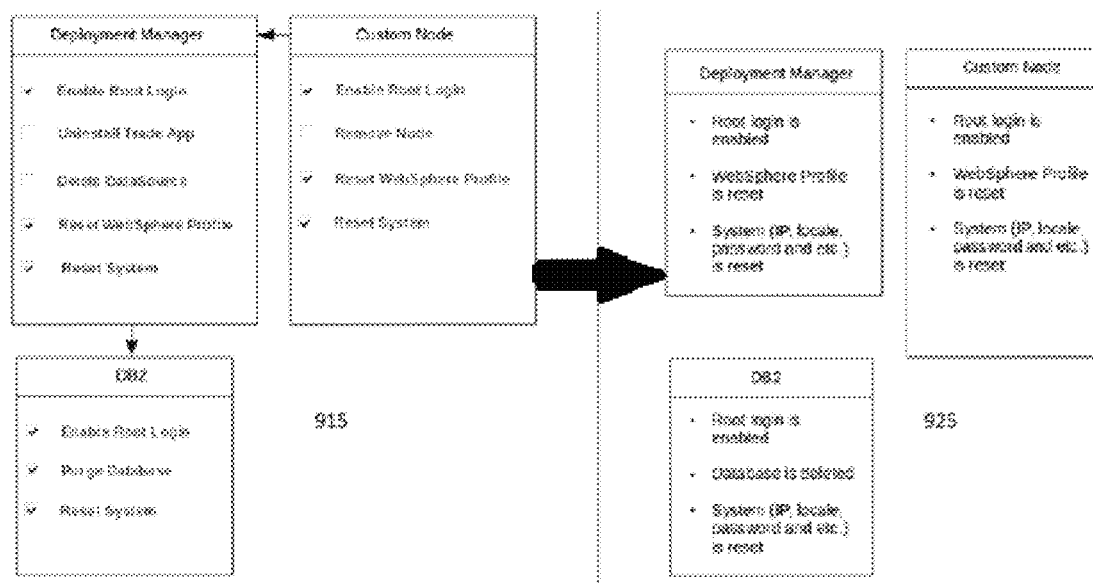
FIG. 9 depicts selecting cleanup scripts in accordance with an example of a specific and non-exclusive topology that may be utilized in an embodiment of the present invention.

FIGS. 8-9 depict one example of a topology, aspects of which may be utilized in an embodiment of the present invention. These figures and the topology illustrated therein are offered only as an example in order to explain certain concepts associated with certain embodiments of the present invention. As understood by one of skill in the art, this topology is offered as a non-limiting example for ease of understanding, only.

An embodiment of the present invention may utilize WebSphere Application Server® (WAS) within a shared computing environment to deploy the instances. WebSphere Application Server® from International Business Machines Corporation (IBM) is a middleware solution. IBM and WebSphere are registered trademarks or trademarks of International Business Machines Corporation in the United States and/or other countries. Utilizing WAS, an embodiment of the present invention can include three parts: 1) a WebSphere Application Server Deployment Manager; 2) a custom node; and 3) a server from a database management system. For the purpose of this example, a DB2 server is utilized as the third element. DB2 is a relational database management system (RDBMS) from IBM. This embodiment of the present invention also includes one or more scripts. Deployment scripts are among the one or more scripts which may include, but are not limited to, scripts that accomplish the following tasks: initiate the system, create profiles (e.g., WebSphere profiles), federate the custom node into the Deployment Manager, create a database (DB) instance and populate a DB, create a data source to connect to a DB2 instance, install and configure application, disable secure shell (SSH) root login. The one or more program 440 may execute one or more of these deployment scripts during pattern deployment. The one or more program 440 may also deploy additional predefined scripts, cleanup scripts that can revert changes made by deployment script packages and reset the system environment (e.g., IP, locale, password, etc.) in response to the one or more program 440 capturing a representation for the whole deployment (e.g., FIG. 7, 715). User or systems utilizing the deployment instance may select or deselect each of the cleanup scripts to run before the one or more program 440 captures the representation (e.g., FIG. 7, 715).

FIG. 8 depicts aspects of creating an original deployment and then capturing it for reuse in another environment in accordance with an example of a specific and non-exclusive topology that may be utilized in an environment of the present invention. For ease of understanding, this example references a deployment manager, a custom node, and a database management system (in this example, DB2). This example is not meant to depict an exclusive architecture and is merely one example of certain aspects of an implementation. FIG. 8 illustrates the one or more program 440 specifying certain parts of a deployment instance, including, but not limited to, elements of the middleware deployed. FIG. 8 illustrates how a custom node 812, a deployment manager 814 and a database management system DB2 816 all contain certain script packages, both deployment scripts and cleanup scripts, that the one or more program 440 may execute in backing up an initial instance and re-deploying that instance in a different environment, for example, in a different domain. In FIG. 8, the one or more program 440 designs the basic pattern for deployment, including middleware elements and the base operating system for each middleware part. The one or more program 440 then creates and attaches deployment script packages and cleanup script packages for each part, and sorts them in the proper order for deployment of the initial instance.

As aforementioned, during the runtime of an instance, a customer may change and/or update some configuration in an instance, including, but not limited to, the operating system or middleware in the virtual resources (e.g., VMs) in the instance. For example, during runtime, a customer may apply some OS security patches, install a new RPM package in a VM, apply some interim fixes for the middleware, etc. Thus, before the one or more program 440 can redeploy the instance in a different environment, the one or more program 440 selects one or more cleanup scripts or receives a selection of one or more cleanup scripts (e.g., from a customer making selections in an application layer) for use in the deployment.

As aforementioned, like FIG. 8, FIG. 9 is merely one example of aspects of one topology for implementation of an embodiment of the present invention. This illustration is offered as a non-limiting example is order to assist in explaining certain aspects of certain embodiments of the present invention. Specifically, FIG. 9 illustrates selecting cleanup scripts in the example, non-limiting, topology depicted in FIG. 8. The left side of the figure 915 depicts a selection from the scripts deployed as part of the deployment instance, which the one or more program 440 obtains. The right side of the figure 925 depicts the representation captured by the one or more program 440, including only the selected scripts. The cleanup scripts specify which configurations should be cleaned up, reset or reverted in the running instance. For example, if the new target environment is completely replicated (including network provision, etc.), for the newly deployed instance to operate, a representation should include the original deployment to the new environment entirely (e.g., no configuration needs to be cleaned up or reset). In this case, no cleanup scripts (or packaged of scripts) would be selected, and the one or more program 440 would capture the deployment directly to restore the instance in the new environment directly without any additional configuration. However, if the new environment is different from the original one (e.g., difference in IP addresses, network configuration, etc.), the one or more program 440 would run "Reset System" script package before capturing a representation of the deployment. In an embodiment of the present invention, the one or more program 440 can capture one or more representations by choosing different cleanup scripts for use in different environments in accordance with the deployment requirements of these individual environments.

When restoring the instance in the new environment, based on the selected cleanup script package, the one or more program 440 can calculate which deployment script package should re-run for the new instance, so that the relationships between different middleware parts in the instance are preserved, and the configuration changes introduced by the customer are manually preserved.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:

deploying, by one or more processor, one or more scripts in a first deployment instance, wherein the first deployment instance is deployed from a first shared computing environment;

determining, by the one or more processor, a difference between the first deployment instance at deployment and the first deployment instance at runtime;

based on the determining, selecting, by the one or more processor, a first script from the one or more scripts;

capturing, by the one or more processor, a representation of the first deployment instance at runtime;

based on the selecting the first script, selecting, by the one or more processor, a second script, wherein the second script implements relationships between resources of the first deployment instance in a subsequent deployment of the first deployment instance; and utilizing, by the one or more processor, the representation, the first script, and the second script to deploy a second deployment instance from a second shared computing environment, wherein the second deployment instance is a subsequent deployment of the first deployment, wherein the second deployment comprises the difference between the first deployment instance at deployment and the first deployment instance at runtime.

2. The method of claim 1, wherein at least one of the first shared computing environment or the second shared computing environment is a cloud computing environment.

3. The method of claim 1, wherein the difference comprises configuration changes implemented in the first deployment instance during runtime.

4. The method of claim 1, wherein the first deployment instance and the second deployment instance each comprise a middleware platform comprising at least two virtual resources.

5. The method of claim 1, wherein the first script comprises a cleanup script, wherein a cleanup script introduces the difference in the second deployment instance, wherein the difference comprises configuration changes implemented during runtime of the first deployment instance.

6. The method of claim 1, wherein the second script comprises a deployment script and wherein the utilizing comprises executing, by the one or more processor, the first script and the second script.

7. The method of claim 1, wherein the representation is a snapshot.

8. The method of claim 1, wherein the difference comprises configuration changes that were manually made by a user to the first deployment instance.

9. The method of claim 1, wherein the relationships between the resources of the first deployment instance are equivalent to the relationships between resources of the second deployment instance.

10. The method of claim 1, wherein the first shared computing environment is distinct from the second shared computing environment.

11. A computer program product comprising:

a computer readable storage medium readable by one or more processor and storing instructions for execution by the one or more processor for performing a method comprising:

deploying, by the one or more processor, one or more scripts in a first deployment instance, wherein the first deployment instance is deployed from a first shared computing environment;

determining, by the one or more processor, a difference between the first deployment instance at deployment and the first deployment instance at runtime;

based on the determining, selecting, by the one or more processor, a first script from the one or more scripts;

capturing, by the one or more processor, a representation of the first deployment instance at runtime;

based on the selecting the first script, selecting, by the one or more processor, a second script, wherein the second script implements relationships between resources of the first deployment instance in a subsequent deployment of the first deployment instance; and utilizing, by the one or more processor, the representation, the first script, and the second script to deploy a second deployment instance from a second shared computing environment, wherein the second deployment instance is a subsequent deployment of the first deployment, wherein the second deployment comprises the difference between the first deployment instance at deployment and the first deployment instance at runtime.

12. The computer program product of claim 11, wherein at least one of the first shared computing environment or the second shared computing environment is a cloud computing environment.

13. The computer program product of claim 11, wherein the difference comprises configuration changes implemented in the first deployment instance during runtime.

14. The computer program product of claim 11 wherein the first deployment instance and the second deployment instance each comprise a middleware platform comprising at least two virtual resources.

15. The computer program product of claim 11, wherein the first script comprises a cleanup script, wherein a cleanup script introduces the difference in the second deployment instance, wherein the difference comprises configuration changes implemented during runtime of the first deployment instance.

16. The computer program product of claim 11, wherein the second script comprises a deployment script and wherein the utilizing comprises executing, by the one or more processor, the second script.

17. The computer program product of claim 11, wherein the first shared computing environment is in a first domain and the second shared computing environment is in a second domain.

18. The computer program product of claim 11, wherein the difference comprises configuration changes that were manually made by a user to the first deployment instance, wherein the relationships between the resources of the first deployment instance are equivalent to the relationships between resources of the second deployment instance, and wherein the first shared computing environment is distinct from the second shared computing environment.

19. A system comprising:

a memory;

one or more processor in communication with the memory; and program instructions executable by the one or more processor via the memory to perform a method, the method comprising:

deploying, by the one or more processor, one or more scripts in a first deployment instance, wherein the first deployment instance is deployed from a first shared computing environment;

determining, by the one or more processor, a difference between the first deployment instance at deployment and the first deployment instance at runtime;

based on the determining, selecting, by the one or more processor, a first script from the one or more scripts;

capturing, by the one or more processor, a representation of the first deployment instance at runtime;

based on the selecting the first script, selecting, by the one or more processor, a second script, wherein the second script implements relationships between resources of the first deployment instance in a subsequent deployment of the first deployment instance; and utilizing, by the one or more processor, the representation, the first script, and the second script to deploy a second deployment instance from a second shared computing environment, wherein the second deployment instance is a subsequent deployment of the first deployment, wherein the second deployment comprises the difference between the first deployment instance at deployment and the first deployment instance at runtime.

20. The system of claim 19, wherein the difference comprises configuration changes that were manually made by a user to the first deployment instance, wherein the relationships between the resources of the first deployment instance are equivalent to the relationships between resources of the second deployment instance, and wherein the first shared computing environment is distinct from the second shared computing environment.

* * * * *